R. L. CRAWFORD.
ANIMAL TRAP.
APPLICATION FILED FEB. 29, 1912.
1,054,177.
Patented Feb. 25, 1913.
2 SHEETS—SHEET 2
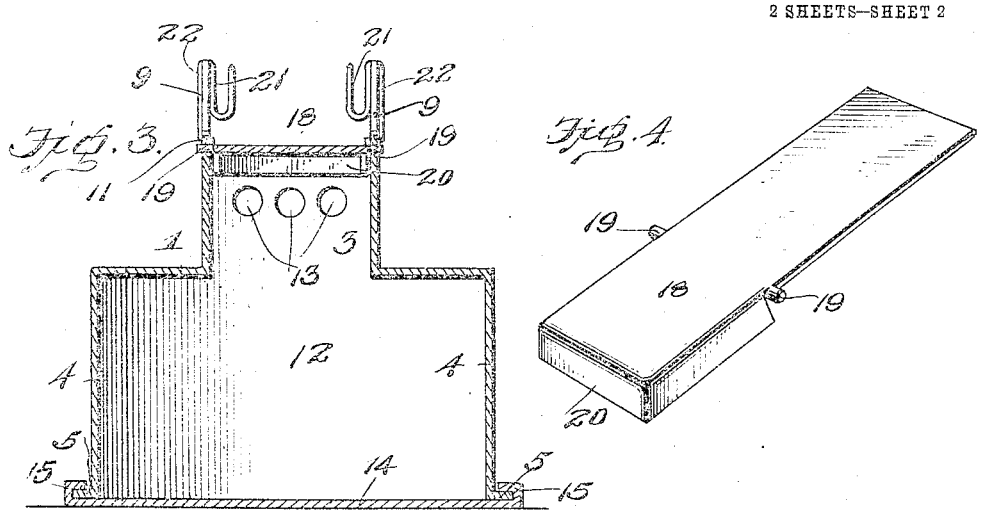
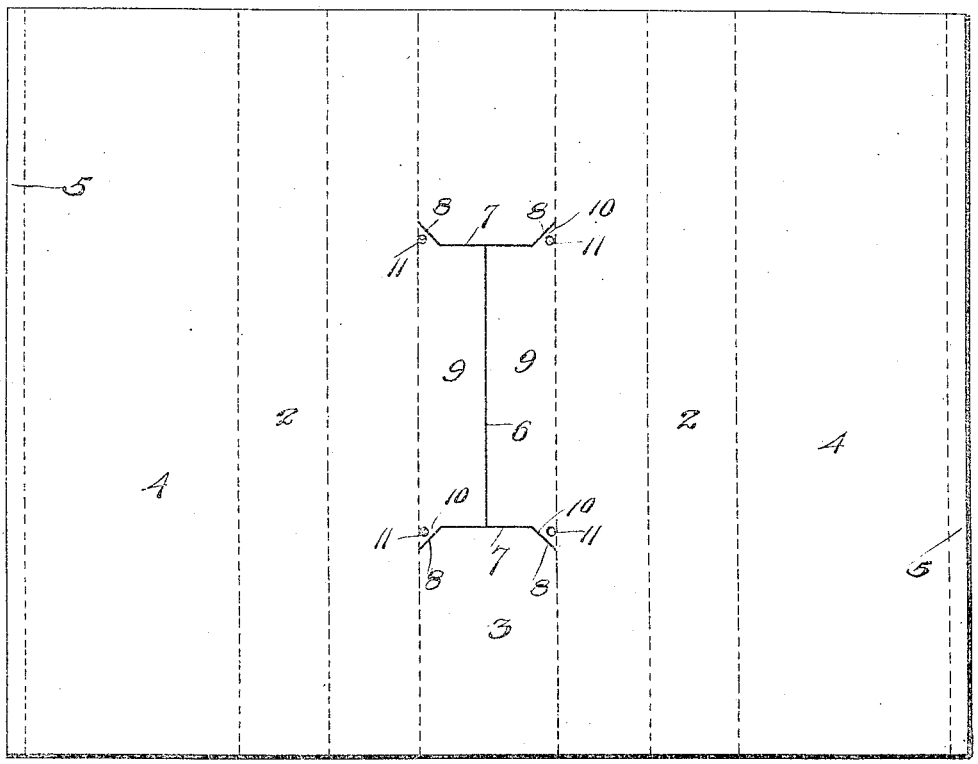
Witnesses
Inventor
R. L. Crawford
by H. B. Willson & Co.
Attorneys

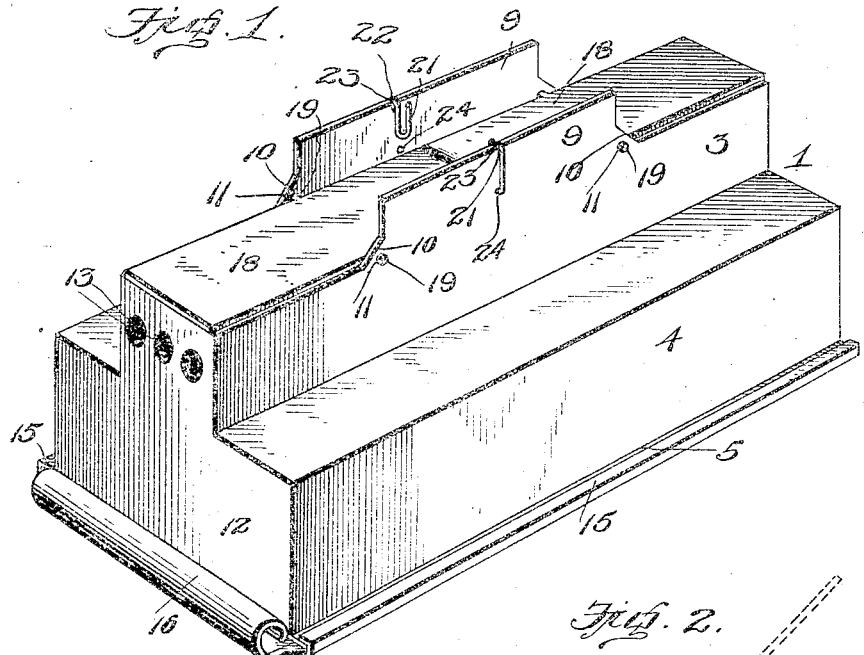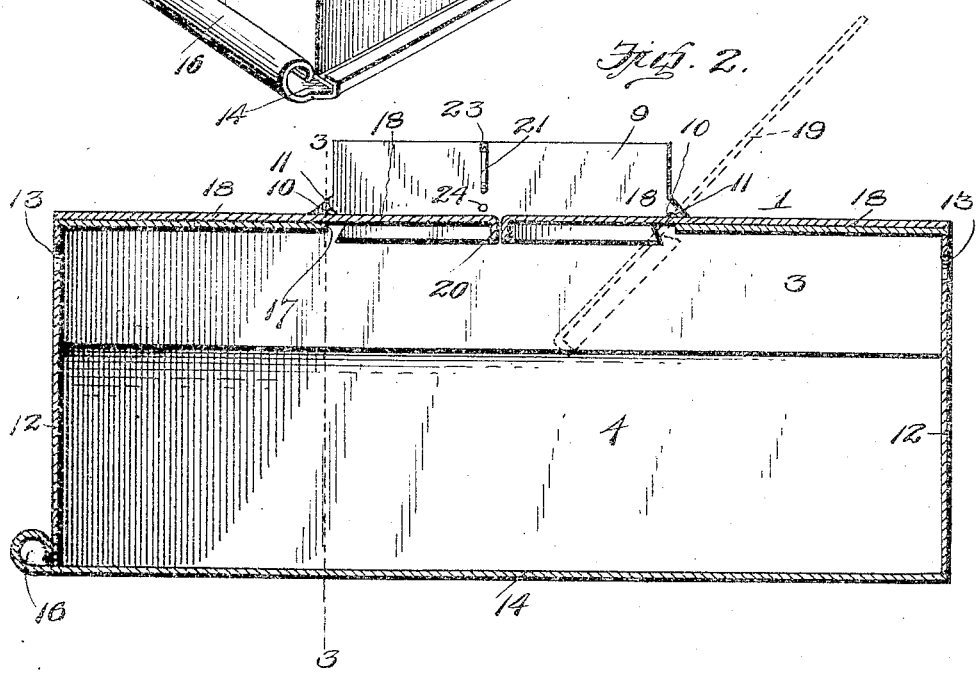

UNITED STATES PATENT OFFICE.

ROBERT L. CRAWFORD, OF FRANKLIN, INDIANA.

ANIMAL-TRAP.

1,054,177.

Specification of Letters Patent.

Patented Feb. 25, 1913.

Application filed February 29, 1912. Serial No. 680,632.

*To all whom it may concern:*

Be it known that I, ROBERT L. CRAWFORD, a citizen of the United States, residing at Franklin, in the county of Johnson and State of Indiana, have invented certain new and useful Improvements in Animal-Traps; and I do declare the following to be a full, clear, and exact description of the invention, such as will enable others skilled in the art to which it appertains to make and use the same.

This invention relates to improvements in animal traps and particularly to the class of self and ever set traps.

One object of the invention is to provide a trap of this character having an improved construction and arrangement of body, the main portion of which is formed from a single piece of metal cut and bent into the desired shape.

To this end the invention consists of certain novel features of construction, and the combination and arrangement of parts as will be more fully described and claimed.

In the accompanying drawings; Figure 1 is a perspective view of my improved trap; Fig. 2 is a central vertical longitudinal section thereof; Fig. 3 is a vertical cross section on the line 3—3 of Fig. 2; Fig. 4 is a detail perspective view of one of the trap doors; Fig. 5 is a plan view of the blank from which the main portion of the body of the trap is formed.

My improved trap comprises a body portion 1 constructed of sheet metal. The main portion or sides and top of the body are formed from a single metal blank 2 of substantially rectangular shape, said blank being bent intermediately of its ends to form a rectangular oblong dome 3, which extends the entire length of the trap. The ends of the blank after being bent to form the dome are bent outwardly and downwardly at right angles to form the sides 4 of the body. The extremities or outer edges of the ends of the blank after forming the sides of the body are bent laterally at right angles to form guide flanges 5 the purpose of which will be hereinafter described. In the center of the blank or the portion thereof forming the top of the dome 3 is cut a longitudinally disposed slit 6 at the ends of which the blank is cut laterally at right angles as shown at 7. At the ends of the right angular cuts 7 are formed short diagonal cuts 8. The portion of the metal between the slits 6, the cuts 7 and 8 and the adjacent outer corners of the drum are bent upwardly at right angles to the top of the drum and in line with the sides thereof to form parallel guide flanges 9 which provide a run way or direct the course of the animal onto the trap doors hereinafter described. The diagonal cuts 8 on the inner ends of the right angular cuts 7 provide webs 10 in which are formed bearing apertures 11 for the trunnions of the trap doors to be described. The ends of the body when formed in the manner described are closed by suitably shaped end pieces 12 which are secured thereto in any suitable manner and which are preferably provided in their upper portions with air holes 13.

The bottom of the trap is in the form of a plate 14 having its side edges bent upwardly and inwardly to form guide ways 15 which are slidably engaged with the guide flanges 5 on the sides of the body. One end of the bottom plate 14 is bent upwardly in the form of a coil which provides a handle 16 whereby the plate may be readily shifted to open and closed positions. When thus constructed and arranged the plate 14 may be readily thrown back to open one end of the bottom of the trap for the purpose of discharging or removing the animals caught therein.

The opening in the top of the drum 3 formed by the cut out and upwardly bent flanges 9 provides the inlet 17 through which the animals enter the trap. The inlet 17 is normally closed by trap doors 18 pivotally mounted in the webs 10 of the flanges 9 by trunnions 19 which are preferably cut from the material forming the doors. The trunnions 19 are arranged nearer the inner ends of the doors than the outer ends so that the longer outer ends will over-balance the inner ends and will swing the doors to a closed position after being opened by the weight of the animals on the inner ends thereof as will be hereinafter described. The portion of the doors between the trunnions and the inner ends thereof is of such length that the inner ends of the doors meet at a point midway between the ends of the inlet opening 17 and the side and end edges of said inner portions of the doors are bent downwardly in the form of right angular flanges 20 which stiffen this portion of the door plates and form smooth rounded edges on the ends of the doors which will prevent the animal from obtaining a foothold on said ends when the door tilts downwardly under the weight of the animal. When thus arranged the outer longer and heavier ends of the doors will normally engage and rest upon the top of the outer ends of the dome, said portion of the dome thus forming supports for the outer ends of the trap doors whereby the latter are normally maintained in a closed horizontal position.

Secured to the guide flanges 9 which form the passageway from the central portion of the dome are bait hooks 21 of wire and have their shanks bent to form loops 22, which are engaged with notches 23 in the upper edges of the flanges 9, said shanks then extending downwardly across the outer sides of the flanges and having their ends bent inwardly and inserted through apertures 24 in the lower portion of the flanges as shown. One of the hooks 21 is arranged in the flange of one side of the dome adjacent to the end of one of the trap doors 18, while the hook on the opposite flange is arranged adjacent to the end of the other trap door.

In the operation of the trap the animal attracted by the bait jumps upon the top of the dome at the end thereof or upon the outer portions of the trap doors engaging this portion of the dome, and upon moving toward the bait, walks into the inner end of one or the other of the trap doors whereupon the weight of the animal upon this free end of the door will over-balance the same, causing said end to tilt downwardly, thus discharging the animal into the trap. As soon as the animal is discharged from the end of the trap door the longer heavier outer end of the same will over-balance the inner end and normally swing the door back to a closed position and ready to receive and catch the next animal attracted by the bait, which it will be understood, is never reached by the animals, and consequently may be repeatedly used thereby obviating the necessity of frequently rebaiting the hook.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In an animal trap of the character described, a body portion having a dome, the top and sides of said dome and body being cut and formed from a sheet metal blank, said blank being slitted along the central portion and having transverse cuts at the ends of said slit, said slitted portions of the metal being adapted to be bent upwardly to form guide flanges with an inlet opening between the same in the top of the dome, a bottom plate secured to the body and adapted to be opened to permit the discharge of the animals caught in the trap, end pieces secured to the ends of the body and dome, and trap doors pivotally mounted between the guide flanges on the dome and adapted to normally close the inlet opening therein and to swing downwardly at their inner ends under the weight of an animal passing thereon.

2. In an animal trap of the character described, a body portion having a dome, the top and sides of said dome and body being cut and formed from a sheet metal blank, said blank being slitted along the central portion of the top of the dome and having therein transverse cuts at the ends of said slit, said slitted portions of the metal being adapted to be bent upwardly in line with the sides of the dome to form the guide flanges of a runway formed by the top of the dome, said flanges when bent upwardly also forming an inlet opening between the same in the top of the dome, laterally projecting flanges formed on the lower edges of the body, a bottom plate having its edges bent inwardly to form guides adapted to be engaged with the flanges on the lower edges of the body whereby said bottom plate is slidably secured to the body and adapted to be opened to permit the discharge of the animals caught in the trap, end pieces secured to the ends of the body and dome and having therein ventilating openings and trap doors pivotally mounted between the guide flanges on the dome and adapted to normally close the inlet opening therein and to swing downwardly at their inner ends under the weight of an animal passing thereon thereby discharging the animal into the trap.

In testimony whereof I have hereunto set my hand in presence of two subscribing witnesses.

ROBERT L. CRAWFORD.

Witnesses:
   THOMAS WILLIAMS,
   ELBA L. BRANIGIN.